United States Patent
Adamson et al.

(10) Patent No.: US 11,355,259 B2
(45) Date of Patent: Jun. 7, 2022

(54) BORON NITRIDE POLYMER COMPOSITE FOAM DERIVED FROM EMULSIONS STABILIZED BY BORON NITRIDE KINETIC TRAPPING

(71) Applicant: University of Connecticut, Farmington, CT (US)

(72) Inventors: Douglas H. Adamson, Mansfield Center, CT (US); Steven Woltornist, Stafford Springs, CT (US); Andrey V. Dobrynin, Willington, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 17/066,174

(22) Filed: Oct. 8, 2020

(65) Prior Publication Data

US 2021/0027907 A1    Jan. 28, 2021

Related U.S. Application Data

(62) Division of application No. 15/447,524, filed on Mar. 2, 2017, now Pat. No. 10,832,828, which is a division
(Continued)

(51) Int. Cl.
*B01J 20/26* (2006.01)
*B82Y 30/00* (2011.01)
(Continued)

(52) U.S. Cl.
CPC .............. *H01B 1/124* (2013.01); *B01J 20/20* (2013.01); *B01J 20/205* (2013.01); *B01J 20/261* (2013.01);
(Continued)

(58) Field of Classification Search
CPC . H01B 1/04; H01B 1/24; H01B 1/124; B82Y 30/00; B01J 20/261; C09K 5/14; C08J 2205/05
(Continued)

(56) References Cited

U.S. PATENT DOCUMENTS 4,524,175 A    6/1985    Stanley, Jr.
5,232,772 A    8/1993    Kong
(Continued)

FOREIGN PATENT DOCUMENTS

CN    103232027 A  *  8/2013  ........... C01B 21/064
CN    103408786 A      11/2013
(Continued)

OTHER PUBLICATIONS

Liu "In-plane heterostructures of graphene and hexagonal boron nitride with controlled domain sizes." Nature Nanotech, vol. 8, p. 119 et seq. (Year: 2013).*
(Continued)

*Primary Examiner* — Tri V Nguyen
(74) *Attorney, Agent, or Firm* — McCarter & English, LLP

(57) ABSTRACT

The present disclosure provides advantageous graphene/graphite stabilized composites (e.g., graphene/graphite stabilized emulsion-templated foam composites), and improved methods for fabricating such graphene/graphite stabilized composites. More particularly, the present disclosure provides improved methods for fabricating pristine, graphene/graphite/polymer composite foams derived from emulsions stabilized by graphene/graphite kinetic trapping. In exemplary embodiments, the present disclosure provides that, instead of viewing the insolubility of pristine graphene/graphite as an obstacle to be overcome, it is utilized as a means to create or fabricate water/oil emulsions, with gra-
(Continued)

phene/graphite stabilizing the spheres formed. These emulsions are then the frameworks used to make foam composites that have shown bulk conductivities up to about 2 S/m, as well as compressive moduli up to about 100 MPa and breaking strengths of over 1200 psi, with densities as low as about 0.25 g/cm$^3$.

13 Claims, 9 Drawing Sheets

Related U.S. Application Data of application No. 14/724,499, filed on May 28, 2015, now Pat. No. 9,646,735.

(60) Provisional application No. 62/061,337, filed on Oct. 8, 2014, provisional application No. 62/005,318, filed on May 30, 2014.

(51) Int. Cl.

| | | |
|---|---|---|
| H01B 1/04 | (2006.01) | |
| C09K 5/14 | (2006.01) | |
| H01B 1/12 | (2006.01) | |
| B01J 20/28 | (2006.01) | |
| B01J 20/32 | (2006.01) | |
| B01J 20/20 | (2006.01) | |
| B01J 20/30 | (2006.01) | |
| C08J 9/12 | (2006.01) | |
| C08J 9/36 | (2006.01) | |
| C09D 5/24 | (2006.01) | |
| C09D 165/00 | (2006.01) | |
| C09K 3/32 | (2006.01) | |

(52) U.S. Cl.
CPC .......... *B01J 20/262* (2013.01); *B01J 20/267* (2013.01); *B01J 20/28011* (2013.01); *B01J 20/28026* (2013.01); *B01J 20/28045* (2013.01); *B01J 20/28095* (2013.01); *B01J 20/3085* (2013.01); *B01J 20/321* (2013.01); *B01J 20/324* (2013.01); *B01J 20/3212* (2013.01); *B01J 20/3272* (2013.01); *B01J 20/3291* (2013.01); *B82Y 30/00* (2013.01); *C08J 9/125* (2013.01); *C08J 9/365* (2013.01); *C09D 5/24* (2013.01); *C09D 165/00* (2013.01); *C09K 3/32* (2013.01); *C09K 5/14* (2013.01); *H01B 1/04* (2013.01); *C08J 2203/10* (2013.01); *C08J 2205/05* (2013.01); *C08J 2325/06* (2013.01)

(58) Field of Classification Search
USPC ....... 252/500, 510, 511; 428/304.4; 423/448
See application file for complete search history.

(56) References Cited

U.S. PATENT DOCUMENTS

| | | |
|---|---|---|
| 6,414,041 B1 | 7/2002 | Gluck |
| 7,008,565 B2 | 3/2006 | Osherov et al. |
| 7,566,410 B2 | 7/2009 | Song et al. |
| 8,110,026 B2 | 2/2012 | Prud'Homme et al. |
| 8,507,568 B2 | 8/2013 | Lee et al. |
| 8,642,503 B1 | 2/2014 | Tai |
| 8,933,174 B2 | 1/2015 | Miwa et al. |
| 9,646,735 B2 | 5/2017 | Adamson et al. |
| 10,832,828 B2 | 11/2020 | Adamson et al. |
| 2003/0150740 A1 | 8/2003 | Bugnet et al. |
| 2004/0089849 A1 | 5/2004 | Osherov et al. |
| 2010/0292355 A1* | 11/2010 | Barger ............... C08J 9/146 521/81 |
| 2011/0045223 A1* | 2/2011 | Lin .................. C01B 21/0687 428/36.9 |
| 2011/0064938 A1 | 3/2011 | Breindel et al. |
| 2011/0091512 A1 | 4/2011 | Li |
| 2011/0273085 A1 | 11/2011 | Garbar et al. |
| 2012/0052395 A1 | 3/2012 | Badre et al. |
| 2013/0068990 A1 | 3/2013 | Eilbracht et al. |
| 2014/0120339 A1 | 5/2014 | Nikova et al. |
| 2014/0305571 A1 | 10/2014 | Adamson et al. |
| 2015/0004087 A1* | 1/2015 | Zettl ................ C01B 21/0645 423/290 |
| 2015/0259212 A1 | 9/2015 | Li et al. |
| 2017/0055339 A1* | 2/2017 | Zhang .................. C08J 9/0071 |

FOREIGN PATENT DOCUMENTS

| | | | |
|---|---|---|---|
| DE | 102012005659 A1 * | 9/2013 | ............. B01J 19/30 |
| EP | 0565237 A1 | 10/1993 | |
| WO | 2014028978 A1 | 2/2014 | |

OTHER PUBLICATIONS

Alauzun "Novel monolith-type boron nitride hierarchical foams obtained through integrative chemistry." J. Mater. Chem., 2011, 21, 14025 (Year: 2011).*
An, X. et al., Stable aqueous dispersions of nanocovalently functionalized graphene from graphite and their multifunctional high-performance applications, Nano Lett. 10, pp. 4295-4301, (2010).
Ansari, S. et al., Oriented arrays of graphene in a polymer matrix by in situ reduction of graphite oxide nanosheets, Small 6, No. 2, pp. 205-209, (2010).
Ashby, Pickering Emulsions Stabilised by Laponite Clay Particles, PCCP, 2, pp. 5640-5646, (2000).
Balandin, A. et al., Superior thermal conductivity of single-layer graphene, Nano Lett. Vol. 8, No. 3, pp. 902-907, (2008).
Barroso-Bujans, F. et al., Tunable uptake of poly(ethylene oxide) by graphite-oxide-based materials, Carbon N. Y. 50, pp. 5232-5241, (2012).
Becerril, H. et al., Evaluation of solution-processed reduced graphene oxide films as transparent conductors, ACS Nano vol. 2, No. 3, pp. 463-470, (2008).
Boukhvalov, D. W. et al., Modeling of graphite oxide, J. Am. Chem. Soc. 130, pp. 10697-10701, (2008).
Chatterjee, S. et al., Mechanical reinforcement and thermal conductivity in expanded graphene nanoplatelets reinforced epoxy composites, Chem. Phys. Lett. 531, pp. 6-10, (2012).
China National Intellectual Property Administration First Office Action for Chinese Application 201580034677.X dated Nov. 21, 2018.
China National Intellectual Property Administration Search Report for Chinese Application 201580034677.X dated Nov. 9, 2018.
Coleman, J. N., Liquid-Phase Exfoliation of Nanotubes and Graphene, Adv. Funct. Mater. 19, pp. 3680-3695, (2009).
European Search Report and Written Opinion for European Application No. 15798851.0 dated Dec. 22, 2017.
Galpaya, D. et al., Recent Advances in Fabrication and Characterization of Graphene-Polymer Nanocomposites, Graphene 2012, 1, pp. 30-49.
Gedler "Thermal stability of polycarbonate-graphene nanocomposite foams." Polymer Degradation and Stability 97(2012)1297-1304. (Year 2012).
Geim, A. et al., The Rise of Graphene, Nat. Mater. vol. 6, pp. 183-191, (2007).
Kim, H. et al., Graphene/Polyurethane Nanocomposites for Improved Gas Barrier and Electrical Conductivity, Chem. Mater. 22, pp. 3441-3450, (2010).
Lee, C. et al., Measurement of the elastic properties and intrinsic strength of monolayer graphene, Science 321, pp. 385-388, (2008).
Lee, J.-U. et al., Estimation of Young's modulus of graphene by Raman spectroscopy, Nano Lett. 12, pp. 4444-4448, (2012).
Ling, L., et al., Macroporous Polymer Nanocomposites Synthesised from High Internal Phase Emulsion Templates Stabilised by Reduced Graphene Oxide, Polymer, vol. 55, pp. 395-402, 2014.

(56) References Cited

OTHER PUBLICATIONS

Liu, H. et al., Reduction of graphene oxide to highly conductive graphene by Lawesson's reagent and its electrical applications, J. Mater. Chem. C 1, pp. 3104-3109, (2013).

Novoselov, K. S. et al., Electric field effect in atomically thin carbon films, Science vol. 306, pp. 666-669, (2004).

Novoselov, K. S. et al., Two-dimensional gas of massless Dirac fermions in graphene, Nature vol. 438(10), pp. 197-200, (2005).

PCT International Search Report and Written Opinion for PCT/US2015/033011 dated Aug. 14, 2015.

Pei, S. et al., The reduction of graphene oxide, Carbon N. Y. 50, pp. 3210-3228, (2012).

Rafiee, M. A. et al., Enhanced Mechanical Properties of Nanocomposites at Low Graphene Content, ACS Nano, vol. 3, No. 12, pp. 3884-3890, (2009).

Singh, V. et al., Graphene based materials: Past, present and future, Prog. Mater. Sci. 56, pp. 1178-1271, (2011).

Stoller, M. D. et al., Graphene-based ultracapacitors, Nano Lett. vol. 8, No. 10, pp. 3498-3502, (2008).

Suk, J. W. et al., Mechanical properties of monolayer graphene oxide, ACS Nano vol. 4, No. 11, pp. 6557-6564, (2010).

"Tkalya et al. ""The use of Surfactants For Dispersing Carbon Nanotubes and Graphene to Make Conductive Nanocomposites,""" current opinion in Colloid and Interface Science, London, Great Britain, vol. 17, No. 4, pp. 225-232, ( 2012)."

Vaia, R. A. et al., Framework for nanocomposites, Materials Today, (November), pp. 32-37, (2004).

Verdejo, R. et al., Graphene filled polymer nanocomposites, J. Mater. Chem. 21, pp. 3301-3310, (2011).

Voom, Polymer-Clay Nanocomposite Latex particles by Inverse Pickering Emulsion Polymerization Stabilized with Hydrophobic Montmorillonite Platelets, Macrom, 39, pp. 2137-2143, (2006).

Vuluga, D. et al., Straightforward synthesis of conductive grapheme/polymer nanocomposites from graphite oxide, Chemical communications (Cambridge, England), 47(9), pp. 2544-2546, (2011).

Wang ("Conductive Polymer Foams as Sensors for Volatile Amines." Chem. Mater., 2003, 15 (2), pp. 375-377). (Year 2003).

Wang, S. et al., Wettability and surface free energy of graphene films, Langmuir 25(18), pp. 11078-11081, (2009).

Weaver, C. L. et al., Electrically Controlled Drug Delivery from Graphene Oxide Nanocomposite Films, ACS Nano, vol. 8, No. 2, pp. 1834-1843, (2014).

Wei, T. et al., Preparation of graphene nanosheet/polymer composites using in situ reduction-extractive dispersion, Carbon N. Y. 47, pp. 2296-2299, (2009).

Woltomist, S. J. et al., Conductive Thin Films of Pristine Graphene by Solvent Interface Trapping, ACS Nano vol. 7, No. 8, pp. 7062-7066 (2013).

Wong, Macroporous Polymer Nanocomposites Synthesised from High Internal Phase Emulsion Templates Stabilised by Reduced Graphene Oxide, Polymer, 55, pp. 395-402, (2013).

XGSciences "XGnP graphene nanoplatelets" Datasheet from www.xgsciences. (Year: 2019).

Young, R. J. et al., The mechanics of graphene nanocomposites: A review, Composites Science and Technology, 72(12), pp. 1459-1476, (2012).

Zhang, Y. et al., Experimental observation of the quantum Hall effect and Berry's phase in graphene, Nature vol. 438(10), pp. 201-204, (2005).

Zheng et al., Macroporous Graphene Oxide-Polymer Composite Prepared through Pickering High Internal Phase Emusions, Applied Materials Interfaces, vol. 5, pp. 7974-7982, 2013.

* cited by examiner

FIGURE 2A
FIGURE 2B
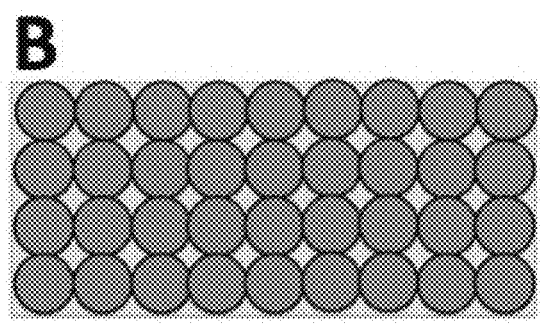
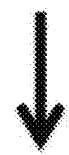
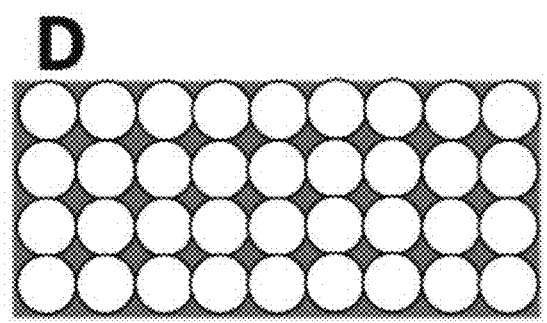
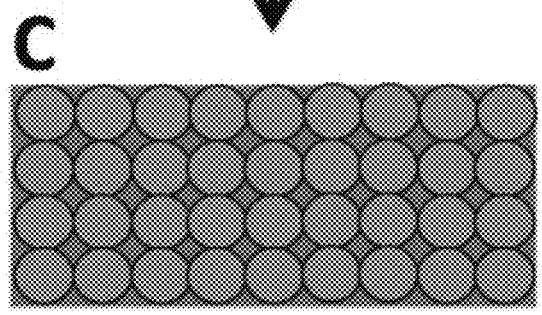
FIGURE 2D
FIGURE 2C FIGURE 5A    FIGURE 5B
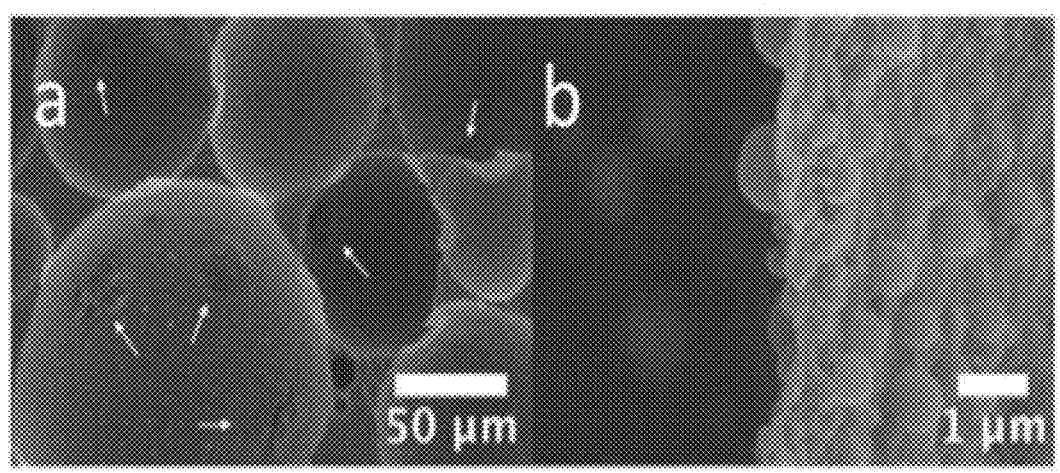
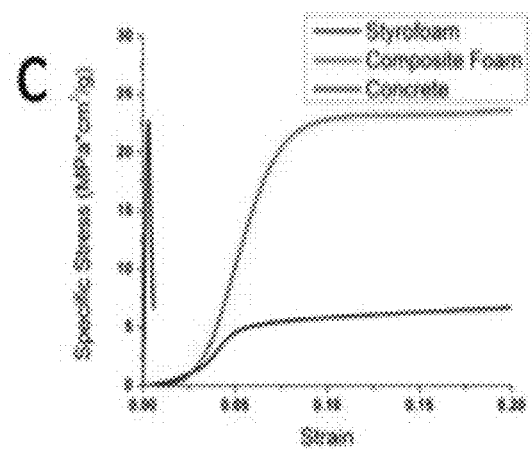
FIGURE 5C ND NITRIDE POLYMER COMPOSITE
FOAM DERIVED FROM EMULSIONS
STABILIZED BY BORON NITRIDE KINETIC
TRAPPING

CROSS-REFERENCE TO RELATED APPLICATIONS

The present application is a divisional application that claims priority to a non-provisional application entitled Graphene/Graphite Polymer Composite Foam Derived from Emulsions Stabilized By Graphene/Graphite Kinetic Trapping," which was filed on Mar. 2, 2017, and assigned Ser. No. 15/447,524, which was a divisional application claiming priority to a non-provisional application entitled Graphene/Graphite Polymer Composite Foam Derived from Emulsions Stabilized By Graphene/Graphite Kinetic Trapping," which was filed on May 28, 2015, and assigned Ser. No. 14/724,499 (now U.S. Pat. No. 9,646,735), and which in turn claimed priority benefit to two (2) provisional applications, as follows: (i) Ser. No. 62/005,318, filed on May 30, 2014, and (ii) Ser. No. 62/061,337, filed on Oct. 8, 2014. Each of the foregoing applications is hereby incorporated by reference in its entirety.

FIELD OF THE DISCLOSURE

The present disclosure relates to graphene/graphite stabilized composites (e.g., graphene/graphite stabilized emulsion-templated foam composites) and related methods of fabrication and, more particularly, to pristine, graphene/graphite/polymer composite foams derived from emulsions stabilized by graphene/graphite kinetic trapping, and related methods of fabrication.

BACKGROUND OF THE DISCLOSURE

In general, graphene has recently gained interest as a filler for composite materials (e.g., because of its intrinsic mechanical, thermal, and electrical properties). For example, graphene's lack of solubility in substantially all solvents has led to the common practice of either using graphene oxide or reduced graphene oxide in the place of pristine graphene sheets. However, both graphene oxide and reduced graphene oxide have significantly reduced mechanical, thermal, and electrical properties when compared to the pristine graphene material.

As noted, graphene has been sought after for its use as a filler in composite materials (e.g., because of its outstanding electrical, thermal, and mechanical properties). Unlike metals with comparable properties, graphene has a relatively low density of about 2.2 g/cm$^3$ and large theoretical surface area to mass ratio of around 2600 m$^2$/g. Problems in dispersion have plagued the field and have unfortunately led to the use of both graphene oxide (GO) and reduced graphene oxide (RGO) in the place of pristine graphene sheets. Both of these substitutes, however, have greatly reduced properties when compared to the pristine material.

In GO, this is a result of the disruption of the delocalized electron network with the addition of oxygen functionalities. Reduction of the GO sheets to make RGO does remove most of the oxygen functionalities; however, it also leaves behind defects such as dislocated bonds that again disrupt the delocalized electron network found in pristine graphene and results in the reduction of the properties mentioned. The lower strength and conductivities are then passed on to the final composite. Some current methods utilizing GO and RGO have processing problems as well. Some processing problems include: harsh in-situ chemical reduction steps, as well difficult solvent removal in the solution mixing method; dispersion problems associated with the high viscosities of melted polymers, as well as the breaking and buckling of sheets from shear stress in the melt blending method; and dispersion and manipulation issues that arise from increases in viscosity in the in-situ polymerization method.

Thus, an interest exists for improved composite materials utilizing graphene as a filler, and related fabrication methods. These and other inefficiencies and opportunities for improvement are addressed and/or overcome by the systems, assemblies and methods of the present disclosure.

SUMMARY OF THE DISCLOSURE

The present disclosure provides advantageous graphene/graphite stabilized composites (e.g., graphene/graphite stabilized emulsion-templated foam composites), and improved methods for fabricating such graphene/graphite stabilized composites. More particularly, the present disclosure provides improved methods for fabricating pristine, graphene/graphite/polymer composite foams derived from emulsions stabilized by graphene/graphite kinetic trapping.

In exemplary embodiments, the present disclosure provides that, instead of viewing the insolubility of pristine graphene/graphite as an obstacle to be overcome, it is utilized as a means to create/fabricate water/oil emulsions, with graphene/graphite stabilizing the spheres formed. These emulsions are then the frameworks used to make composites (e.g., foam composites) that have shown bulk conductivities up to about 2 S/m, as well as compressive moduli up to about 100 MPa and breaking strengths of over 1200 psi, all with densities as low as about 0.25 g/cm$^3$.

Stated another way, in previous conventional methods, the lack of solubility of pristine graphene/graphite was viewed as an obstacle to be overcome. The present disclosure provides that by using an interface trapping method, the lack of solubility of pristine graphene/graphite is advantageously utilized to both exfoliate and trap graphene/graphite, as well as form stable emulsions used as the framework for polymer/graphene/graphite composites (e.g., hollow polymer/graphene/graphite composites). Research has shown film climbing using an interface trapping method in a heptane and water mixture. See, e.g., U.S. patent application Ser. No. 14/248,547 and 61/812,285, and Woltornist, S. J., Oyer, A. J., Carrillo, J.-M. Y., Dobrynin, A. V & Adamson, D. H., *Conductive Thin Films Of Pristine Graphene By Solvent Interface Trapping, ACS Nano* 7, 7062-6 (2013), the entire contents of each being hereby incorporated by reference in their entireties.

In exemplary embodiments, the present disclosure provides for the formation of spheres of water surrounded by oil stabilized by pristine graphene/graphite sheets through altering both the ratios of water/oil and the concentration of graphite in the system. Furthermore, by changing the oil phase from heptane to a monomer, an emulsion is made in which the oil phase may then be polymerized. In certain embodiments, styrene (and divinyl benzene as a crosslinker) is utilized as the oil phase and a thermally initiated free-radical polymerization was performed, although other monomers and polymerization methods may be used as well (as discussed further below).

After the polymerization of the continuous phase is complete, a composite is formed with polystyrene as the matrix and spherical cavities/areas lined with pristine graphene/graphite sheets and filled with water. After a gentle evaporation process, the water is removed. The final product is a polymer/graphene/graphite composite foam with exceptional mechanical strength, conductivity, and low density. Sphere size may also be controlled through altering the concentration of graphene/graphite, as well as the ratio of water/oil. Finally, through the incorporation of a conductive polymer, both the strength and the conductivity may be increased, the latter by up to two orders of magnitude.

The present disclosure provides for a method for fabricating a composite including: a) providing a phase separated system of two non-mixing solvents, the phase separated system including: (i) a first solvent and a second solvent, and (ii) an interface between the first and second solvents; b) introducing a layered material to the interface of the phase separated system; c) forming an emulsion of the first and second solvents, at least a portion of the layered material stabilizing the emulsion; and d) adding a monomer and polymerizing the first solvent phase of the emulsion to form a matrix material having cavities lined with portions of the layered material.

The present disclosure also provides for a method for fabricating a composite wherein the first solvent is an oil and the second solvent is water; wherein the emulsion is a water/oil emulsion; wherein the oil phase of the emulsion is the continuous phase of the emulsion; and wherein after step c), the water/oil emulsion includes spheres of water surrounded by oil, the spheres of water coated and stabilized by layers or sheets of the layered material. The present disclosure also provides for a method for fabricating a composite wherein the oil is styrene and the layered material is substantially pristine graphite; wherein the emulsion is formed via mixing and sonication; and wherein after step d), the matrix material includes polystyrene.

The present disclosure also provides for a method for fabricating a composite wherein the first solvent phase of the emulsion includes monomers selected from the group consisting of styrene, isoprene, butyl acrylate, divinylbenzene, methyl acrylate, tetra(ethylene glycol) diacrylate, and butyl methacrylate.

The present disclosure also provides for a method for fabricating a composite wherein the cavities of the matrix material include substantially spherical cavities. The present disclosure also provides for a method for fabricating a composite wherein step d) includes a thermally initiated free-radical polymerizing step/process. The present disclosure also provides for a method for fabricating a composite wherein after step d), the second solvent is removed from the matrix material; wherein the second solvent is removed from the matrix material via an evaporation step/process; and wherein after the second solvent is removed from the matrix material, the matrix material has an open pore foam structure.

The present disclosure also provides for a method for fabricating a composite wherein the portions of the layered material lining the cavities include graphene or graphite; and wherein the graphene or graphite is substantially pristine graphene or graphite. The present disclosure also provides for a method for fabricating a composite wherein the portions of the layered material lining the cavities include individual sheets or layers of graphene or graphite.

The present disclosure also provides for a method for fabricating a composite wherein after the second solvent is removed from the matrix material, the matrix material has a bulk conductivity of about 2 S/m, a compressive modulus of about 100 MPa, a breaking strength of at least about 1200 psi, and a density of about 0.25 g/cm$^3$.

The present disclosure also provides for a method for fabricating a composite wherein the first solvent is an oil and the second solvent is water; and wherein the emulsion is a water/oil emulsion. The present disclosure also provides for a method for fabricating a composite wherein the first solvent phase of the emulsion is the continuous phase of the emulsion; and wherein the matrix material is a polymeric matrix material.

The present disclosure also provides for a method for fabricating a composite wherein the second solvent phase of the emulsion is also polymerized to form the matrix material; and wherein prior to polymerization, the second solvent phase of the emulsion includes monomers.

The present disclosure also provides for a method for fabricating a composite wherein after step d) the matrix material is electrically conductive. The present disclosure also provides for a method for fabricating a composite wherein prior to step d) the second solvent includes poly(3, 4-ethylenedioxythiophene) poly(styrenesulfonate); and wherein after step d) the poly(3,4-ethylenedioxythiophene) poly(styrenesulfonate) forms a conductive coating on at least a portion of the cavities of the matrix material.

The present disclosure also provides for a method for fabricating a composite wherein after the second solvent is removed from the matrix material, the matrix material is contacted with a solution containing poly(3,4-ethylenedioxythiophene) poly(styrenesulfonate); and wherein after contacting the matrix material with the solution containing poly(3,4-ethylenedioxythiophene) poly(styrenesulfonate), the matrix material is dried and the poly(3,4-ethylenedioxythiophene) poly(styrenesulfonate) forms a conductive coating on at least a portion of the cavities of the matrix material.

The present disclosure also provides for a method for fabricating a composite including: a) providing a phase separated system, wherein the phase separated system is an oil and water based system having an interface between the oil and water; b) introducing substantially pristine graphene or graphite to the interface of the oil and water based system; c) forming a water/oil emulsion with the oil phase of the emulsion including monomers, the water/oil emulsion including spheres of water surrounded by oil, the spheres of water coated and stabilized by layers or sheets of the graphene or graphite; d) polymerizing the oil phase of the emulsion to form a polymeric matrix material having substantially spherical cavities lined with layers or sheets of the graphene or graphite, the oil phase of the emulsion the continuous phase of the emulsion; and e) removing the water from the polymeric matrix material; wherein after step e), the polymeric matrix material has an open pore foam structure, and is electrically conductive.

The present disclosure also provides for a composite including a polymeric matrix material having an open pore foam structure, the open pore foam structure having cavities lined with substantially pristine graphene or graphite layers or sheets; wherein the polymeric matrix material is electrically conductive. The present disclosure also provides for a composite wherein the polymeric matrix material includes polystyrene; wherein the cavities of the polymeric matrix material include substantially spherical cavities; and wherein the graphene or graphite lining the cavities include individual sheets or layers of graphene or graphite.

The present disclosure also provides for a composite wherein the polymeric matrix material has a bulk conductivity of about 2 S/m, a compressive modulus of about 100 MPa, a breaking strength of at least about 1200 psi, and a density of about 0.25 g/cm$^3$.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIGS. 2A-2D show the formation of emulsion-templated foam composites: FIG. 2A—vial of spheres of water surrounded by oil and stabilized by graphene/graphite sheets—the concentration of graphene/graphite was lowered to form spheres of a size adequate for demonstration; FIG. 2B—through sonication and mixing, the sheets are exfoliated and trapped at the interface and form spheres; FIG. 2C—the styrene is then thermally initiated and the polymerization proceeds; FIG. 2D—the water is gently evaporated out of the cavities, leaving a low density hollow composite;

FIG. 3A—optical microscopy image of graphene/graphite stabilized emulsion, FIG. 3B—scanning electron micrograph of a cross-section of the composite after polymerization, FIG. 3C—graphene/graphite sheets seen lining the inside of the spherical cavities of the composite foams, and FIG. 3D—graphene/graphite composite foams of various sizes with a U.S. quarter for scale;

FIG. 4A—potential of the mean force for graphene a flake. Insets show typical graphene flake configurations. The solvent into which the graphene flake is pulled is transparent. In the insets, the hydrogen atoms of water molecules are yellow, oxygen atoms of water are blue, the carbon atoms belonging to styrene are red, and the hydrogen atoms of styrene are green. Graphene flakes are shown in cyan. In FIG. 4B—schematic representation of a water droplet with size R covered with a graphene skin formed by flakes of size a;

FIGS. 5A-5C display morphology and compressive strength—FIG. 5A—scanning electron micrograph of a composite foam with visible sphere-sphere contact points indicated with arrows. These areas often sag because of the lack of supporting polymer. FIG. 5B—micrograph of a cross section of a sphere-sphere contact point. The small spheres seen on both sides of the sheet arise from the very small amount of styrene soluble in the water phase. FIG. 5C—stress/strain curves of the composite foam and other industrial materials normalized by material density. Note the composite foam has the high specific strength of concrete, but without the catastrophic failure mechanism.

FIG. 7A—sample with one quarter the initial amount of graphite; FIG. 7B—sample with one eighth the initial amount of graphite;

DETAILED DESCRIPTION OF DISCLOSURE

Figure 1:
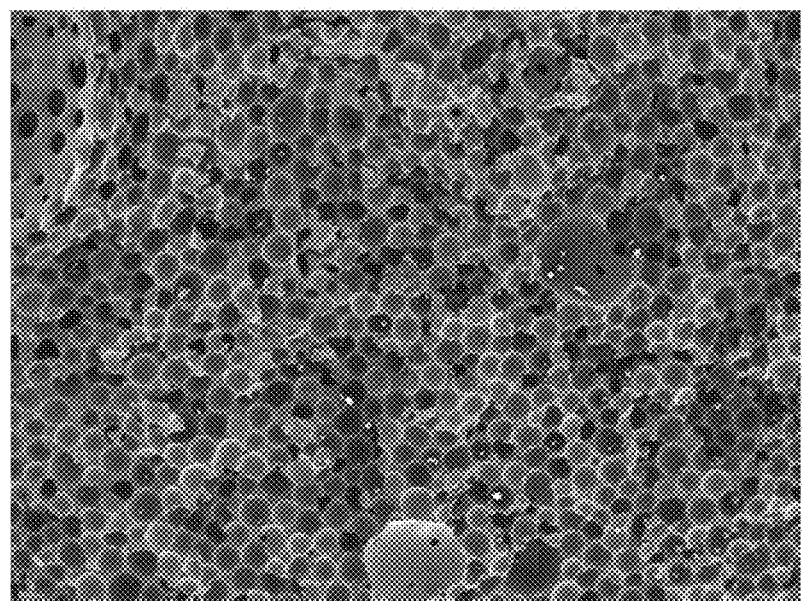
FIG. 1 is a FESEM image of an exemplary composite foam material according to the present disclosure, and the polymer is polystyrene in this example embodiment.

The exemplary embodiments disclosed herein are illustrative of advantageous graphene/graphite stabilized composites (e.g., graphene/graphite stabilized emulsion-templated foam composites), and systems of the present disclosure and methods/techniques thereof. It should be understood, however, that the disclosed embodiments are merely exemplary of the present disclosure, which may be embodied in various forms. Therefore, details disclosed herein with reference to exemplary composites/fabrication methods and associated processes/techniques of assembly and use are not to be interpreted as limiting, but merely as the basis for teaching one skilled in the art how to make and use the advantageous composites/systems and/or alternative composites/systems of the present disclosure.

The present disclosure provides improved graphene/graphite stabilized composites (e.g., graphene/graphite stabilized emulsion-templated foam composites), and improved methods for fabricating such graphene/graphite stabilized composites. More particularly, the present disclosure provides advantageous methods for fabricating pristine, graphene/graphite/polymer composite foams derived from emulsions stabilized by graphene/graphite kinetic trapping.

In exemplary embodiments, the present disclosure provides for a conductive polymer/graphene/graphite composite (e.g., nano-composite) that can be made with a variety of morphologies (e.g., sphere size, sphere size dispersity, graphene/graphite sheet size, graphene/graphite loading, overall shape, etc.) to give it unique properties depending on the intended application. The composite may be made hollow to give it a low density, and made with a variety of polymers to make it rigid and/or flexible. In certain embodiments, the material/composite is fabricated by forming an emulsion using a layered material (e.g., graphene/graphite) as a stabilizer. This stabilization is a result of kinetic trapping of graphene sheets or several layers of graphene flakes at a solvent/solvent interface. Polymerizing one of the phases yields a graphene/graphite/polymer composite with an open pore foam structure, electrical conductivity, and/or high strength.

In general, the present disclosure provides for a conductive plastic/graphene/graphite composite that is applicable to a wide variety of uses. Some potential uses include: heat transfer, electronics, supercapacitors (or ultra capacitors), catalyst supports, oil absorption, flexible batteries, UV degradation resistance, and filters. The composites of the present disclosure also can be used in applications that require high compressive strength or flexibility.

Currently, methods that attempt to make conductive polymer nanocomposites with graphene-like materials use chemically altered graphene, which greatly reduces the thermal and electrical conductivity of such composites. The present disclosure advantageously uses pristine graphene/graphite, thereby greatly increasing strength and conductivity of the exemplary composites. Another approach is to use CVD grown graphene, produced one sheet at a time, allowing only very small samples at a very high cost.

The systems/methods of the present disclosure reduce cost and fabrication time, and the fabricated composites are substantially lighter than current materials. The systems/methods of the present disclosure also allow for the formation of conductive foam composites that are electrically conductive and extremely robust.

Using some of the systems/methods of the present disclosure, a foam structure that has hollow spheres lined with pristine, unaltered graphene/graphite from bulk graphite can be fabricated. In certain embodiments, the composite/material has an open pore structure with high surface area, and is electrically conductive. FIG. 1 displays a FESEM image of an exemplary composite foam material according to the present disclosure. In FIG. 1, the example polymer is polystyrene, although the present disclosure is not limited thereto. Rather, it is noted that other polymers may be utilized (e.g., dienes, styrene, acrylates, methacrylates, addition polymers, step-growth polymers, etc.).

The composites are extremely strong, with compressive strengths greater than 1,000 psi. They are very inexpensive, especially compared to CVD grown graphene materials.

Conductivities of about 2 S/m for the bulk material have been measured. Impressive compressive strength has been shown as well, with a maximum breaking load of about 1200 psi, and a compressive modulus of about 100 MPa.

It is noted that films of graphene using the interface trapping method have been fabricated, where graphene sheets are trapped as they are unstacked from graphite. In exemplary embodiments, the systems/methods of the present disclosure advantageously produce emulsions of graphene/graphite with liquids (e.g., two non-mixing solvents, such as oil and water) on both the inside and the outside of the graphene/graphite. In general, at least one of the liquids includes monomers that are later polymerized, and a user is then left with a highly ordered structure composed of connected spheres.

The present disclosure provides several possible fabrication approaches, including:

1) Having the monomer on the outside of the spheres and water on the inside of the spheres. The material outside of the spheres is then polymerized. This then connects the spheres and holds the graphene/graphite in place in the spherical shape. The spheres can be filled with water, which can be evaporated out under gentle heating.

2) Having the monomer on both the inside and outside of the spheres and then polymerizing both phases. Both polymers then hold the graphene/graphite in place, giving it increased mechanical strength, but without the hollow spheres as noted above.

In both cases, the graphene/graphite is held in place by the polymer. It is also forces/provides conductivity because the flakes are connected from the process used to create the spheres.

The advantageous systems/methods of the present disclosure can also increase the conductivity of the composites with the addition of conductive polymers, such as, for example, poly(3,4-ethylenedioxythiophene) poly(styrenesulfonate) (PEDOT:PSS).

The present disclosure provides for at least two methods to add the conductive polymer to the composite material.

One method adds the PEDOT:PSS to the water used as the inner phase of the spheres before the polymerization. After the polymerization is complete, the PEDOT:PSS is left behind and forms a conductive coating on the inside of the spheres.

Another method provides that a solution of PEDOT:PSS can be infused into a finished hollow nanocomposite by submerging the composite in the solution and putting it under vacuum. This replaces the air in the hollow cavities with the solution. The sample is then removed and dried slowly. As the water evaporates, the conductive polymer is left behind and again forms a conductive coating on the inside of the hollow spheres.

In both cases, the conductive polymer serves as a bridge between the graphene/graphite sheets, leading to higher conductivity of the fabricated composite.

The present disclosure will be further described with respect to the following examples; however, the scope of the disclosure is not limited thereby. The following examples illustrate the advantageous systems/methods of the present disclosure of fabricating improved graphene/graphite stabilized composites (e.g., graphene/graphite stabilized emulsion-templated foam composites).

Example 1

In certain embodiments, a unique aspect of the exemplary foam composites is their hollow structure. This structure imparts both the low density, as well as the conductivity. In exemplary embodiments, synthesis of the composite begins with a layered material (e.g., graphite, such as graphene sheets or layers of graphite) being placed at the interface of a phase separated system (e.g., at an interface of two non-mixing solvents, such as a styrene/water system).

Typically, when graphene is exfoliated in a solvent (e.g., through sonication), the sheets immediately re-stack because of van der Waals attraction. In the interface trapping method, exfoliated sheets are instantly adsorbed to the high-energy liquid-liquid interface, where they are trapped because of the lowering of the interfacial energy of the system that the sheet provides. This has been tried with various oil phases, most notably heptane. In certain embodiments of the present disclosure, styrene is utilized in lieu of heptane, with the intent to polymerize the oil phase.

As more sheets are exfoliated, they climb up the interface to continue to minimize the interfacial energy as much as possible. Films have been created through this covering of the interface. In certain embodiments, the amount of graphite added is substantially greater compared to the amount of graphite used to create such films.

In order to continue the interfacial energy minimization, spheres are formed, thereby creating more surface area for the graphene/graphite sheets to adsorb on to. The resulting emulsion is used as a template for the creation of the composites (e.g., foam composites). In one specific styrene/water system, the emulsion consists of spheres of water, coated with graphene, and surrounded by styrene. This composition is important, because it creates a network of continuous connected styrene that is the backbone of the polymerized composite. Similar spheres may be seen in FIG. 2A. For FIG. 2A, it is noted that the concentration of graphene/graphite was lowered to form spheres of a size adequate for demonstration, and that the spheres found in the composite emulsions are usually much smaller.

Once the emulsion is formed (FIG. 2B), the polymerization is thermally initiated, as photo-initiation can be difficult because of the absorption of light by the graphene sheets. In exemplary embodiments, after about 24 hours, the polymerization is complete (FIG. 2C). The water is then removed through gentle heating around 80° C. (FIG. 2D), and the result is a hollow foam graphene/graphite/polystyrene composite. The composites produced by this method have extremely low densities, normally about 0.25 g/cm$^3$.

FIGS. 2A-2D show the formation of emulsion-templated foam composites: FIG. 2A—vial of spheres of water surrounded by oil and stabilized by graphene/graphite sheets—the concentration of graphene/graphite was lowered to form spheres of a size adequate for demonstration; FIG. 2B—through sonication and mixing, the sheets are exfoliated and trapped at the interface and form spheres; FIG. 2C—the styrene is then thermally initiated and the polymerization proceeds; FIG. 2D—the water is gently evaporated out of the cavities, leaving a low density hollow composite.

Morphological studies of the graphene/graphite foam composites were carried out using a JEOL 6330 field emission scanning electron microscope (FESEM). The spherical cavities left from the absence of the water phase were visible. Also visible is the layer of graphene/graphite sheets originally trapped between the styrene and water phase, now held in place by the polystyrene matrix. Using a 50/50 ratio of water/styrene, an average sphere size was obtained. Small beads of polystyrene are also found on top of the graphene layer. These are believed to be from styrene suspended in the water during the emulsification process.

As was seen in FESEM micrographs, the areas where the two spheres meet had substantially very little or no polymer layer in between, only graphene/graphite. This structural property is important to the conductivity of the composites. In essence, through the emulsion-templated synthesis, the conductivity is thus forced; as opposed to other composite formation methods where percolation occurs only after the threshold is met for a network of randomly dispersed particles to be formed. Through this method of the present disclosure, however, conductivity is essentially guaranteed as long as the spheres are formed and stable.

The sphere/sphere contact areas also provide pathways for the water to escape during the evaporation process. It is noted that films generated from the interface trapping method were seen to have about 80% coverage, with small spaces in between, as seen by transmission electron microscopy (TEM). These spaces provide ample space for the water vapor to diffuse out. Interestingly, if the pre-dried sample is put immediately into high vacuum, the water bursts out of the spheres violently, creating a popcorn-like effect.

Sphere/cavity size control has been shown through varying the concentration of graphite, as well as altering the ratio of styrene to water in the initial emulsion. A progression in sphere size from a 90/10 water/styrene ratio to a 50/50 water/styrene ratio all while keeping the graphene/graphite concentration constant (concentration dependence may be seen in the SI) was shown. In most ratios, there is either excess water or excess styrene. One optimal ratio (for the concentration used) for minimum excess of either phase is a 75/25 water/styrene ratio. Interestingly, even adding enough water to get to an 80/20 water/styrene ratio results in a large amount of excess water seen at the bottom.

Both compression strength and electrical conductivity are seen to have a strong dependence on sphere size. With the smaller spheres, there is more surface area covered by the graphene/graphite per unit mass. For compressive strength, this means an increase in reinforcement surface area provided by the graphene sheets and therefore increased mechanical strength. With regards to conductivity, the increase in surface area without changing the concentration of the graphene/graphite results in less overlap of the sheets, and therefore lower conductivity.

As previously stated, the areas where the spheres are in contact with one another provide the access points for the water to evaporate out of the system. These areas are also the means by which other solutions may be infused into the system. By submerging a composite sample in a solution and placing the system under gentle vacuum (with an aspirator), the air is forced out of the cavities in the material. The solution then enters the cavities to fill in the void. In this specific system, a sample was infused with an aqueous suspension of Poly(3,4-ethylenedioxythiophene) Polystyrene sulfonate (PEDOT:PSS).

Once all of the cavities are filled (when the composite stopped releasing bubbles), the sample is again placed under gentle heating. This process slowly evaporates the water, while leaving the PEDOT:PSS behind. As the graphene/graphite sheets are typically only found at the surface of the cavities, the PEDOT:PSS left behind provides a coating that connects the graphene/graphite sheets, therefore dramatically increasing conductivity. Alternatively, the PEDOT:PSS solution may instead be used in place of or along with the water phase in the initial preparation of the emulsions. Again, as the water evaporates out in the end, the PEDOT:PSS is left behind, thereby resulting in a dramatic increase in conductivity.

The PEDOT:PSS film was seen "draping" over the polystyrene beads and graphene/graphite. Through this method, conductivities may be improved by up to two orders of magnitude. As the polymer leaves behind a coating, there is also added mechanical strength compared to the unmodified system. In compressive testing, up to a 20% increase in breaking strength compared to the unmodified samples has been observed.

Throughout this disclosure, a model system with styrene (with divinylbenzene) and water as the two phases has been described. It is noted that many other monomers may be used, however, to tune the system to the properties desired. During research, isoprene, butyl acrylate, divinylbenzene, methyl acrylate, tetra(ethylene glycol) diacrylate, and butyl methacrylate have all been used. In certain embodiments, instead of the high compressive strength seen with polystyrene, a flexible foam composite may be made with polyisoprene. Ultra low densities may also be realized by substituting the styrene for butyl acrylate.

In certain embodiments, requirements of the oil phase come from the theory behind the interface trapping method. Essentially, the surface energy of the graphene should be between those of the oil and water phases. As graphene has a surface energy of $\gamma_g$=54.8 mN/m, and water has a surface energy of $\gamma_w$=72.9 mN/m, the surface energy of the oil phase should ultimately be below 54.8 mN/m.

Example 2:—Exfoliation of Pristine Surfactant-Free Graphite Via Emulsion Formation Enabling the Formation of Strong, Electrically Conducting Foams A method for the large scale, inexpensive exfoliation of pristine graphite by the formation of graphene/graphite-stabilized emulsions is disclosed. Unlike previous approaches to graphite exfoliation, no oxidation or reduction chemistry is employed, and no surfactants, high boiling solvents, or other stabilizers are required, thus preserving the intrinsic properties of the graphite. An exemplary technique disclosed herein is environmentally friendly and takes advantage of the insolubility of graphite to create stable emulsions, with graphene/graphite sheets playing the role of surfactant by stabilizing the oil/water interface. An application enabled by this method is the formation of open cell foams containing a continuous graphene network. The exemplary foams have remarkable mechanical properties with compressive moduli of up to around 100 MPa and breaking strengths of over 8.3 MPa (1200 psi) at densities below 0.35 g/cm³. Furthermore, the percolating graphene/graphite network makes these foams electrically conductive at low loadings with bulk conductivities approaching 7 S/m.

The excitement surrounding the potential of graphene as a nano-filler in composite materials is driven by its unique set of properties. However, challenges associated with graphite's solubility and dispersion have plagued the field and led to the widespread use of graphene oxide (GO) and reduced graphene oxide (rGO) as substitutes for the pristine material at the cost of inferior filler properties that are passed on to the final composites. The present disclosure advantageously provides an alternative and environmentally friendly approach to graphite exfoliation that avoids the use of chemical treatments or the addition of stabilizers such as surfactants or high boiling solvents that can be difficult to remove. The methods of the present disclosure takes advantage of graphite's inherent insolubility and the large interfacial energies between aqueous and organic solvents to kinetically "trap" graphene/graphite sheets at an oil/water interface and thus form a graphene stabilized emulsion. In this context graphene/graphite sheets can be viewed as two-dimensional surfactants with internal bending rigidity.

A common theme in previous investigations of graphite-based composites has been that the lack of graphene/graphite solubility is a challenge to be overcome by chemical modification or the addition of stabilizers such as surfactants. This has led to additional processing limitations such as harsh in-situ chemical reduction steps, difficult solvent removal methods, lack of dispersion associated with the high viscosities of melted polymers, breaking of sheets from shear stress in melt blending methods, and dispersion and manipulation issues from increases in viscosity in in-situ polymerization methods. The methods of the present disclosure use the insolubility of graphene/graphite as an advantage by adding it to a mixture of two immiscible solvents. This leads to graphite exfoliation as the sheets are adsorbed at the high-energy liquid-liquid interface, lowering the total free energy of the system. The graphene/graphite sheets become kinetically trapped at the interface of the two solvents, playing the role of a stabilizing agent, and leading to the formation of stable emulsions.

These emulsions can be dried as a source of graphite nano-platelets, or used to template graphene/graphite composite foams by using various monomers as the continuous oil phase. After the polymerization of the continuous phase, the water filled spherical cavities are lined with pristine graphene/graphite sheets and a gentle evaporation process removes the water, leaving a final open foam composite material with exceptional mechanical strength, electrical conductivity, and low density with cells sizes easily controllable by varying the mixture composition. Applications of these low cost materials include strong and lightweight building materials, filters, ultra capacitor electrodes, and conductive catalyst supports.

Figure 3A:
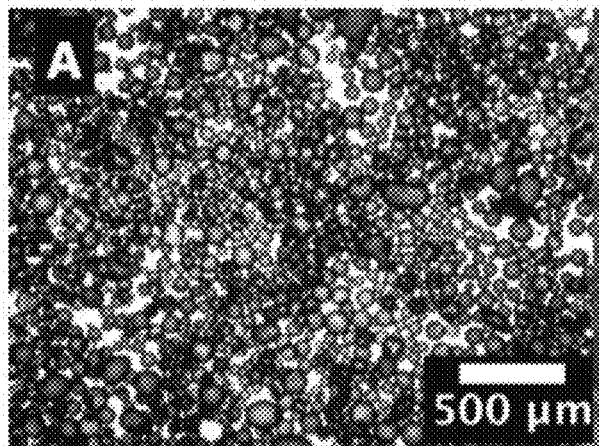
FIGS. 3A-3D show formation of emulsion-templated foam composites.
Figure 3B:
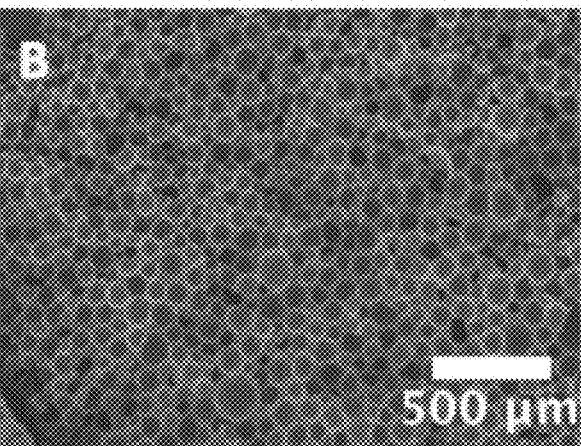
Figure 3C:
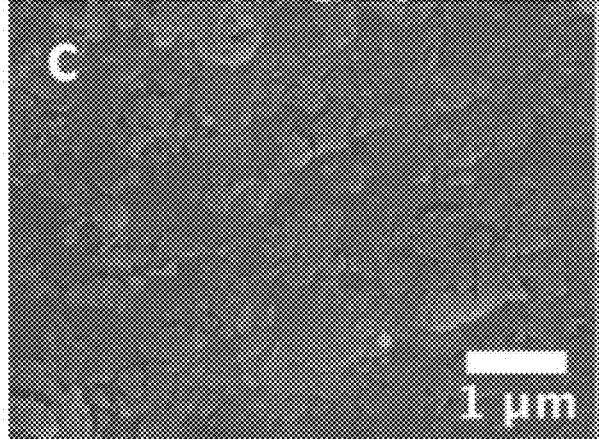
Figure 3D:
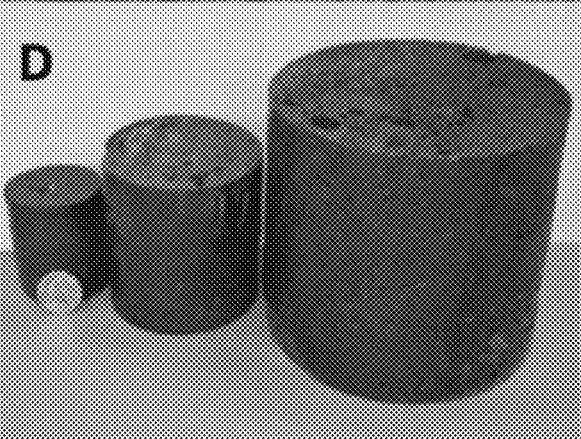

The methods of the present disclosure demonstrate an exemplary technique for making composite graphene/graphite foams by utilizing styrene as the oil phase in the graphene/graphite stabilized water/oil emulsion. The exfoliation of the natural flake graphite is accelerated by gentle sonication in the water/styrene mixture and an example of the graphene-stabilized emulsion under optical microscopy before polymerization is shown in FIG. 3A. It is noted that some of the spheres have coalesced because of the transfer process needed for imaging on a glass slide. Morphological studies of the graphene foam composites after polymerization were carried out using a JEOL 6330 field emission scanning electron microscope (FESEM), and a typical image is shown in FIG. 3B. The imaged surface is much like the surface of a golf ball, with concave divots covering the entire surface. The spherical cavities formed by the water phase of the emulsion are visible, and a higher magnification image clearly shows a layer of graphene/graphite sheets lining the interior of the cavities (FIG. 3C). Using a 50/50 ratio of water/styrene, the average sphere size is about 75 um. The process is highly scalable, and FIG. 3D shows composites of increasing overall size all with the same basic foam structure.

To confirm the surface activity of graphene/graphite sheets at the water/styrene interface, detailed molecular dynamics simulations of a graphene/graphite flake in a water/styrene mixture were performed.

Figure 4A:
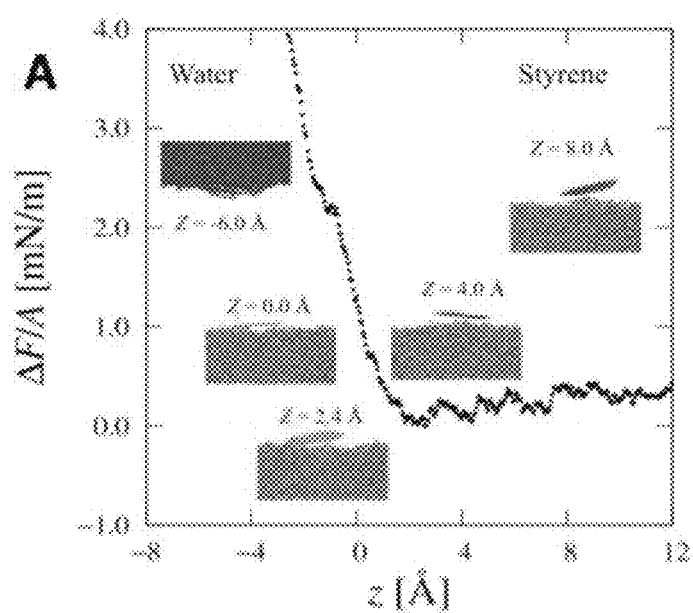
FIGS. 4A-4B show.
Figure 4B:
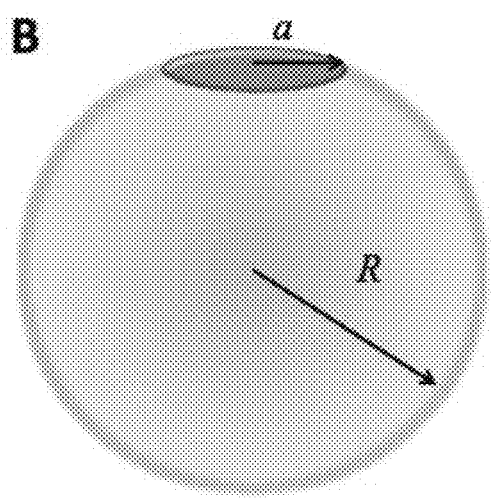

The strength of attraction between a graphene/graphite flake and water/styrene interface was evaluated by calculating the potential of the mean force (see FIG. 4A). The minimum of the potential is located in the styrene phase, indicating that although insoluble in both phases, the preference of the graphene/graphite is for styrene rather than water. The increase of the potential in the styrene phase is not as steep as that observed in the water phase, proving that the styrene is a better solvent for graphene flakes than is water. Oscillations seen in the potential of mean force indicate displacement of the aligned styrene molecules as the graphene flake is moved further away from the interface. The magnitude of the potential in the plateau regime is on the order of $|\Delta g| \approx 0.4$ mN/m. Using this value the work that would be required to displace a 100 nm graphene sheet from the water/styrene interface into styrene phase was estimated. This work is equal to about 966 $k_B T$ (where $k_B$ is the Boltzmann constant and T=300 K). Note that the penalty to move a graphene sheet into a water phase would be even higher. Therefore, graphene sheets are effectively trapped at the water/styrene interface.

Affinity of the graphene towards the water/styrene interface promotes the formation of smaller droplets to maximize the system free energy gains. However, graphene sheets adsorbed at the surface of smaller droplets have to bend in order to remain at the interface between the two immiscible liquids. This bending produces an elastic energy penalty for each graphene sheet covering the surface of a droplet. The total free energy of an emulsion occupying volume V and consisting of droplets with size R covered by graphene sheets with size a consists of an elastic and surface energy contribution and is written as follows:

$$\frac{\Delta F_{total}}{V} \approx \frac{E}{384} \frac{\beta}{\alpha} \frac{a^4}{R^4} - \frac{3|\Delta g|}{\alpha R} \qquad \text{(Equation 1)}$$

where $\Delta g$ depends on the emulsion composition, $\alpha$ and $\beta$ depend on the component densities, and E is the Young's modulus of the graphene sheet (around 1 TPa).

Analysis of equation 1 shows that the surface energy term favors the formation of smaller droplets to increase the area of the water/graphene/styrene interface while the elastic energy term tends to decrease the interface curvature to minimize sheet bending. The equilibrium size of the droplets is obtained by optimizing the system free energy $\Delta F_{total}$ with respect to droplet size R:

$$R^* \approx \left(\frac{E\beta a^4}{288|\Delta g|}\right)^{1/3} \quad \text{(Equation 2)}$$

Equation 2 shows that we can control the size of the droplets by changing the emulsion composition (changing parameter $\Delta g$) or by varying the graphene sheet size a.

For example, in an emulsion with a 1% weight fraction of graphene flakes ($\beta \approx 0.03$) of size 1.0 µm, it is expected that the equilibrium size of the droplets to be on the order of 64 µm.

It is important to point out the similarity between the stabilization of the water/oil emulsions by surfactants and the exemplary emulsions by graphene/graphite sheets. In the case of surfactants, the equilibrium size of the droplets is due to spontaneous curvature of the surfactant bilayer that arises from competition between head-head and tail-tail interactions. In the exemplary emulsions of the present disclosure, the graphene/graphite sheets can be viewed as surfactant bilayers in which spontaneous curvature arises from competition between sheet bending rigidity due to the chemical bonding of carbon atoms into a two dimensional lattice and graphene/graphite interactions with water and oil.

As seen in the FESEM micrographs in FIGS. 5A and 5B, the area where the two spheres touch has no polymer, only graphene/graphite. This structural feature is important to the conductivity of the composites as it provides the contact between the graphene sheets of different spheres. As opposed to typical composites where percolation occurs only after a threshold concentration of randomly dispersed particles is reached, the exemplary system of the present disclosure builds a well-ordered percolating network of graphene prior to polymerization.

Figure 6:
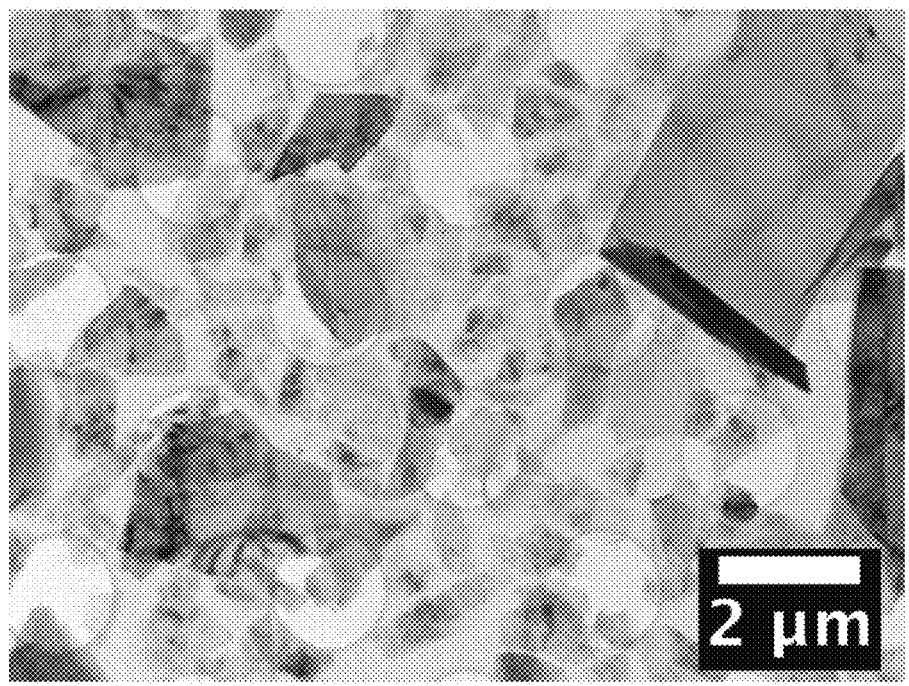
FIG. 6 shows a transmission electron microscopy (TEM) image of the graphene layers at the emulsion interface.

The sphere/sphere contact areas also provide pathways for water to escape during the evaporation process. Experimental modeling of the emulsion formation mechanism indicates that the oil/water interface is roughly 80% covered by graphene sheets three to five layers thick. A transmission electron microscopy (TEM) image of the graphene layers at the emulsion interface are shown in FIG. 6.

If gentle heat is applied, the spaces between graphene/graphite sheets provide ample space for water to diffuse out. If, however, the sample is in high vacuum while still containing water, the water bursts out of the spheres violently, creating a popcorn-like effect with broken spheres clearly visible.

Figure 7A:
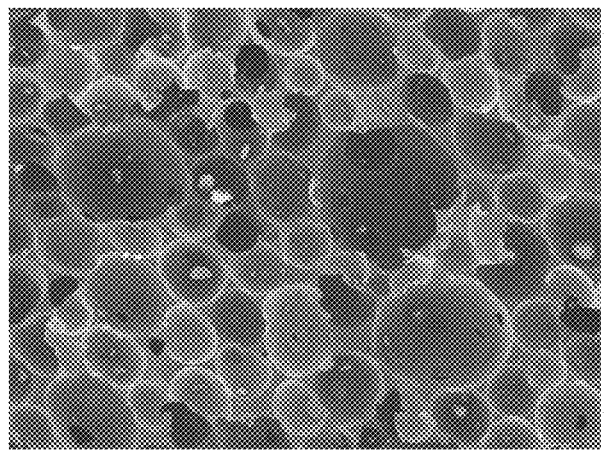
FIGS. 7A and 7B show FESEM micrographs of lower concentration samples.
Figure 7B:
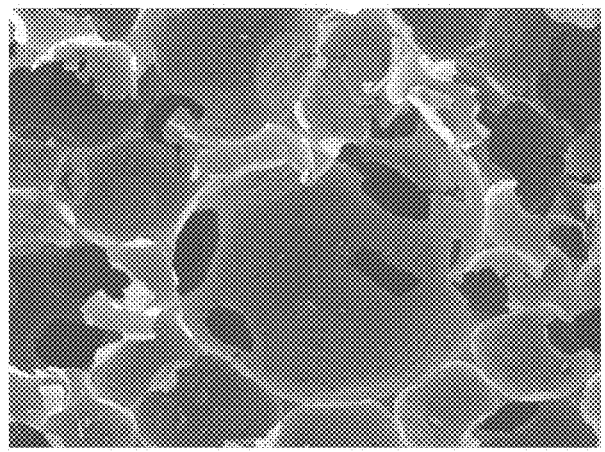

The size of spheres is controlled by altering the ratio of styrene to water in the emulsion, as well as by varying the amount of graphite. Table 1 shows the progression of sphere size from a 9/1 to a 1/1 water/styrene ratio with a constant graphene concentration. The dependence of graphene/graphite concentration is shown in FIGS. 7A and 7B.

Figure 8:
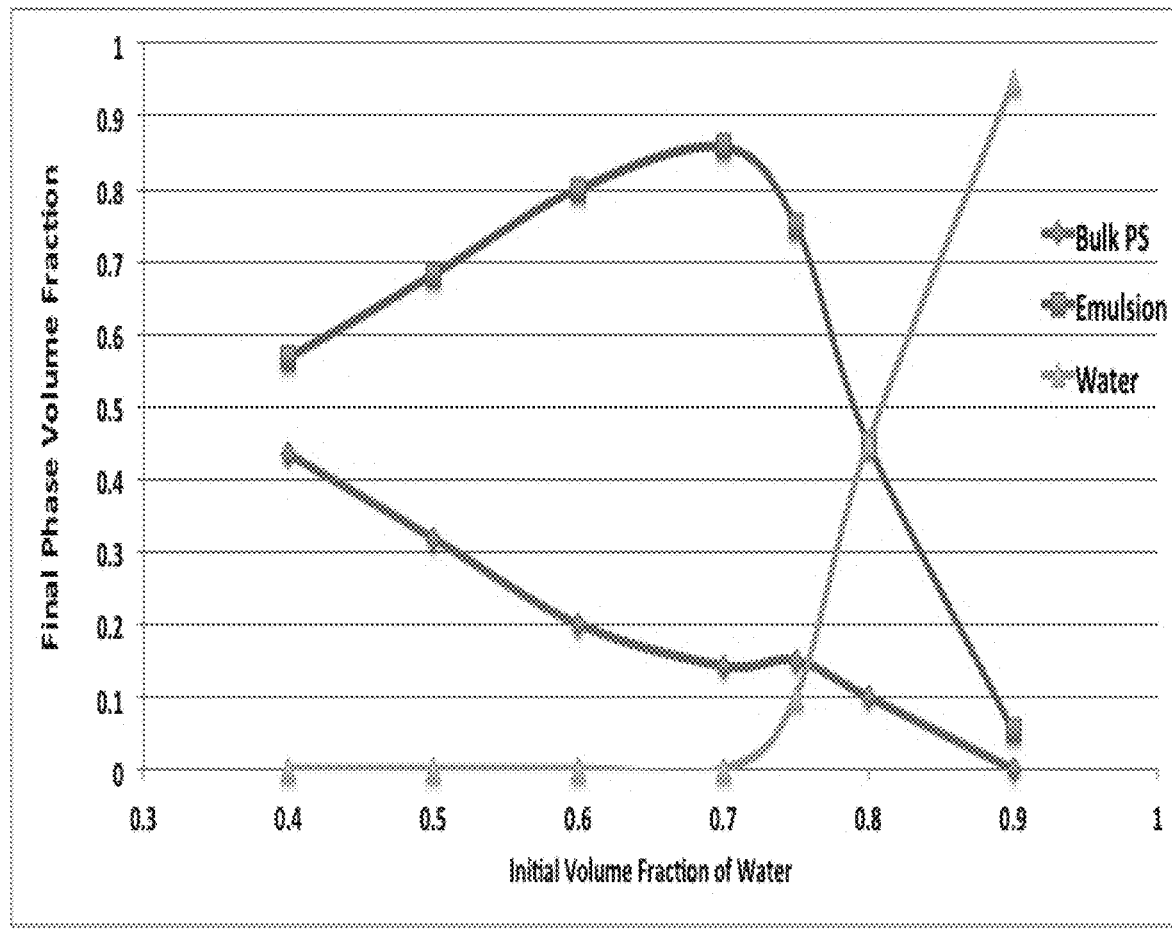
FIG. 8 shows the final phase volume fraction as a function of the initial volume fraction of water in the system. The fraction of emulsion in the system goes up until it reaches the stable 7/3 ratio. After that, one sees minor coalescence at 3/1 and major coalescence at 4/1. By 9/1, there is little if any emulsion.

The relative amount of each solvent in the initial mixture also determines the volume fraction of the emulsion phase. In a 7/3 water/styrene ratio, the final volume of the sample is composed entirely of the emulsion. If the volume fraction of the water is lowered, the system has an excess styrene phase, and when the volume fraction of water is raised, the emulsion loses its stability and the graphene spheres coalesce, leaving an excess of water. The relationship between solvent volume ratio and emulsion volume fraction is plotted in FIG. 8.

TABLE 1

| Ratio (H$_2$O/Styrene) | Apparent Sphere Size (um) | Density (g/cm$^3$) | Compressive Breaking Strength MPa (psi) | Conductivity (S/m) | Loading Percent |
|---|---|---|---|---|---|
| 1/1 | 75 | 0.26 | 5.3 (773) | 0.043 | 5.73 |
| 3/2 | 113 | 0.27 | 5.2 (762) | 0.051 | 4.9 |
| 7/3 | 140 | 0.3 | 5.4 (781) | 0.054 | 4.81 |
| 3/1 | 166 | 0.22 | 3.6 (527) | 0.07 | 2.22 |
| 4/1 | x | 0.15 | 1.1 (155) | 0.148 | 8.76 |
| 9/1 | x | x | x | x | x |

Both compression strength and electrical conductivity are shown to be strongly dependent on sphere size, with smaller spheres appearing to lead to higher compressive strengths. Compressive strength is roughly constant until the spheres reach 166 µm at a 3/1 solvent ratio. At this and greater ratios, the emulsions begin to coalesce and the volume fraction of emulsion in the mixtures becomes smaller. At a 4/1 ratio, the regular foam structure is nearly gone and an average sphere size cannot be determined. Even though the composite contains a large fraction of graphite, the collapse of the regular sphere structure results in a weak material.

Electrical conductivity is observed to trend in the opposite direction, with larger spheres showing increased conductivity. In contrast to the compressive strength, the increase in graphite loading leads directly to higher conductivities. Although the packed sphere structure of the graphene/graphite foam composite results in electrical conductivity at low loadings, the conductivity is not dependent on the structure and can be achieved by large graphite loading levels.

Figure 9:
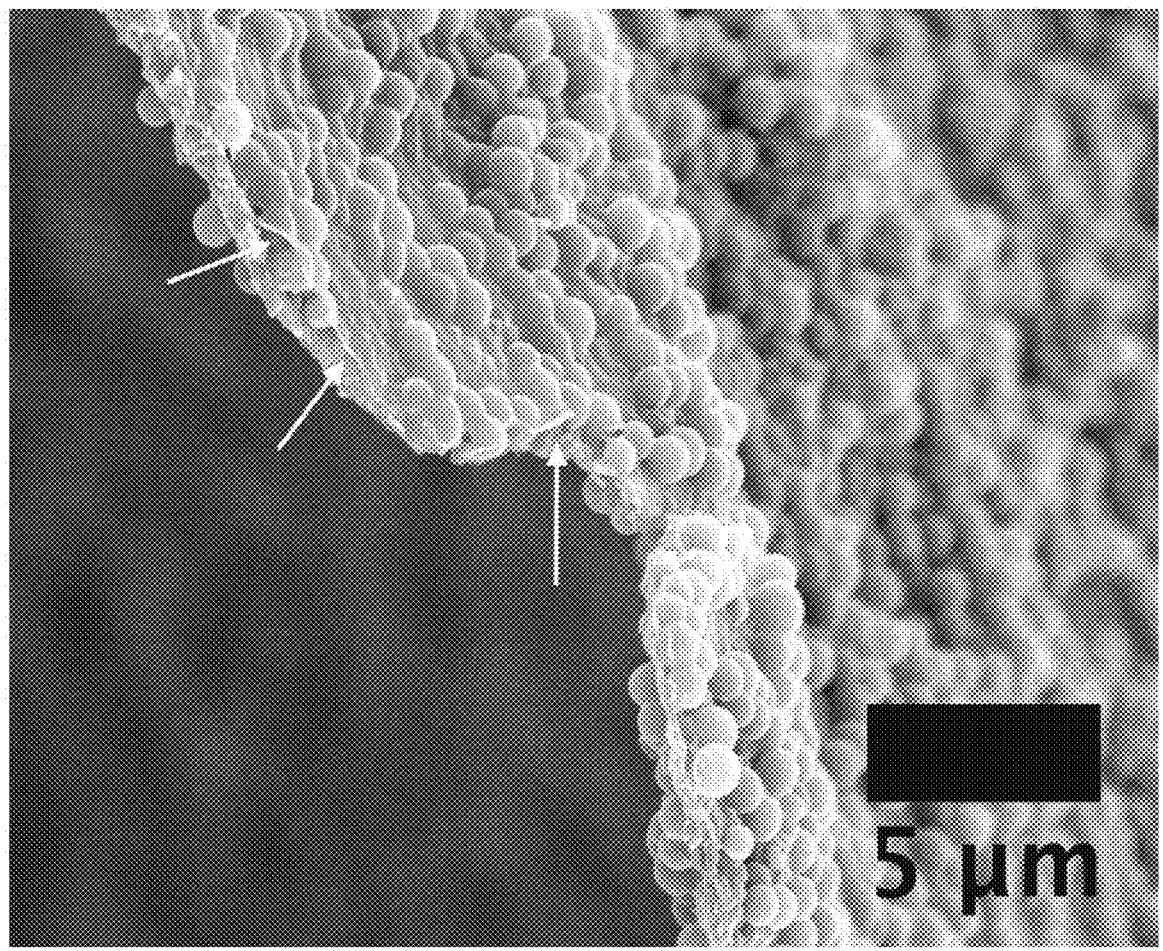
FIG. 9 shows that after the water evaporates from the foam, the PEDOT:PSS left behind drapes over the PS beads and graphene sheets.

The areas where the spheres are in contact with one another provide both electrical contact between the sphere as well as passage ways for the removal of water. They also provide an opportunity by which other solutions may be infused into the system. Submerging a composite sample in a solution and placing the system under gentle vacuum, the solution replaces the air in the foam. Infusing the graphene/graphite composite foam with an aqueous suspension of poly(3,4-ethylenedioxythiophene):poly(styrene sulfonate) (PEDOT:PSS), followed by the evaporation of water, leaves a layer of PEDOT:PS lining the interior surfaces of the foam. Alternatively, an aqueous PEDOT:PSS solution is used in place of the water phase in the initial preparation of the emulsions. After the water evaporates from the foam, the PEDOT:PSS left behind "draped" over the PS beads and graphene sheets as shown in FIG. 9. A dramatic increase in conductivity and compressive strength is observed, with conductivities improved by up to two orders of magnitude, from 0.08 S/m to 7 S/m for a 0.7 initial water volume fraction sample, and the compressive strength increased by up to 20%.

Although the graphene/graphite foam composite described uses water with styrene as the oil phase, many other monomers have been used. These include isoprene, butyl acrylate, divinylbenzene, and butyl methacrylate. Flexible foam composites are observed with polyisoprene and ultra low densities are realized with butyl acrylate. Limitations on the choice of oil phase comes from the theory behind the interface trapping method. The oil phase should have a surface energy less than the surface energy of graphene and be nearly insoluble in the water phase. As graphene has a surface energy of 54.8 mN/m, and water has a surface energy of 72.9 mN/m, the surface energy of the oil phase must be below 54.8 mN/m. The low surface energy of styrene and most other monomers easily fits this criteria.

In summary, the present disclosure has provided a technique to produce low density, conductive, high compressive strength polymer/graphene/graphite foam composites using an interface trapping method to form emulsions that serve as the composite template. The graphene/graphite sheets that line the foam cavities form a conductive network in the system at very low graphite loadings. Additionally, the present disclosure demonstrates that the electrical conductivity and strength of the composite foams may be increased dramatically through the infusion of conductive polymers such as PEDOT:PSS. The foams are inexpensive and the processing method is environmentally friendly with no volatile organic solvents, oxidations, reductions, or high temperatures required. Applications such as strong and lightweight building materials, ultra capacitor electrodes, conductive catalyst supports, and filtration are expected to be enabled by these materials and are being investigated.

Example 3:—Creation of Composite Materials Containing Exfoliated and Dispersed Graphene/Graphite for Use as a "Master Batch"

A method of producing a source of pre-exfoliated and dispersed graphene/graphite for use as a "Master Batch" is disclosed. Current procedures to create polymer composites with graphite based filler materials are limited to using chemically modified graphite or graphene to aid in dispersion and exfoliation. The chemical modification involved leads to severely degraded mechanical, electrical, and thermal properties. The methods used are also often time consuming, expensive, and harmful to the environment.

By mixing graphite, monomer, and water and adding energy, emulsions are formed with graphene/graphite lining spheres of water. The monomer may then be polymerized and the water evaporated out to produce porous composite materials. In these materials, dispersed and exfoliated graphene/graphite is present at the surface of the spheres.

If one were to simply mix graphite or reduced graphene oxide into a polymer melt, phase separation would occur and the percolation threshold would not be reached, therefore there would be no conductivity. By taking the composite material described above and mixing it into the melt (usually the composite is made from the same polymer as the melted polymer), the graphene/graphite mixes uniformly throughout the sample since it is both exfoliated and dispersed prior to mixing. This would enable the facile creation of large amounts of conductive polymer/graphene/graphite composites in an environmentally friendly and cost effective manner.

Example 4:—Creation of Flexible Conductive Composite Materials

A method of producing flexible graphene/graphite/polymer composites is disclosed. By simply altering the monomer used in the creation of the emulsions, one may vary the properties to match the application desired. One such embodiment substitutes a mixture of butyl acrylate and a crosslinking agent (such as divinylbenzene or tetra(ethylene glycol) diacrylate) for styrene. This substitution enables the creation of a flexible variant of the composite utilizing the same theory as previous composites.

The continuous network of graphene/graphite throughout the composite enables them to be used in flexible electronics, such as capacitors and batteries. Additionally, the cost of such devices would be substantially lower than traditional metal-based devices.

Due to the ordering of the graphene/graphite sheets in the composite, the resistance changes upon compression. Specifically, resistance has been seen to change by about two orders of magnitude. Furthermore, the effect is repeatable over many compression and release cycles. One such possible application of this effect is as a pressure sensor. Again, pressure sensors made using this material would be lightweight, cheap, and environmentally friendly.

In addition to the electronic properties of the material, the composites have the potential to be used for oil cleanup. Upon placing the composite into a mixture of oil and water (simulating an oil slick), the composite readily absorbs the oil, while leaving most (if not all) of the water behind. Furthermore, the composite swells dramatically to accommodate large amounts of oil. After the oil has been absorbed, it may then be removed, and the oil squeezed out for the composite to be re-used. Additionally, the composite also removes some of the contaminants from the oil soaked up.

Example 5:—Creation of Composite Materials Containing Hexagonal Boron Nitride

A method of creating boron nitride/polymer composites is disclosed. As previously mentioned, the theory does not simply encompass graphene and or graphite as the two dimensional surfactant. One example of another filler to be used in a similar fashion is hexagonal boron nitride. While similar in shape to graphene/graphite, boron nitride has very different properties, which are highly desirable for many modern applications. Perhaps most useful is that boron nitride is both a thermal conductor and electrical insulator.

The fabrication of the boron nitride/polymer composites utilizes the same principles as the graphene/graphite based examples, although a slight varying of the ratios and initiator is generally required. Specifically, benzoyl peroxide is used (just for one example) instead of AIBN as AIBN is thought to react with boron nitride.

Ultimately, composites with similar properties to those of the graphene/graphite/polymer composites are created. Usually, the composites have slightly higher densities, due to more polymer being incorporated. However, this is accompanied by significantly higher compressive strengths. Possible uses for the boron nitride/polymer composites include catalyst support, filters, and industrial materials. Additionally, one promising application is as a heat-sink in electronics. As the composites would be thermally, but not electronically, conductive, they would be able to be placed directly against electronic components to remove heat without worrying about electrical shorts.

Flexible composites may also be created in a manner similar to that of the graphene/graphite/polymer composites. These composites also have the potential to be used in oil cleanup. After soaking the oil up, the oil in the composites may be lit and burned without compromising the structure of the composite material. It may then be reused.

Methods:
Production of Polystyrene/Graphene/Graphite Composites:

The following is the procedure for the production of an emulsion-templated foam composite with a graphene concentration of 4.4 mg/mL and a 75/25 water/styrene ratio. The other ratios and concentrations are simply adjusted accordingly.

A flask is charged with 880 mg of graphite (Asbury Carbons Grade 2299), along with 150 mL water (Deionized), 50 mL styrene (Acros Organics, 99.5%), 12 mL divinylbenzene (Aldrich, 80%), and a stir bar. The contents are then mixed on a stir plate for 30 seconds, followed by 30 seconds of bath sonication (Branson 80W B2510DTH). 150 mg of azobisisobutyronitrile (Aldrich, 98%) is then added to the same flask. The system is then mixed on a stir plate for a minimum of 15 minutes while being purged with Ar gas (Fisher). After the purging process, the contents of the flask are poured into a Waring Commercial Blender (Model 33BL79) and covered with Ar gas. The blender is then turned on full power for about 1 minute. The newly formed emulsion is then placed into a 250 mL jar and sealed under Ar gas. The jar is then placed in an oven (Thermo Electron Corporation, Model 6500) at about 70° C. for 24 hours. After the reaction is complete, the composite samples are removed from the jars and heated at around 80° C. for about 2 days to remove substantially all water from the cavities. Excess bulk polystyrene may simply be cut off of the top if necessary.

Alternatively, the reaction may be heated in an oil bath for the same amount of time. Although the oven is more convenient, there are sometimes "bubbles" that form in the composites that are believed to be from the inability to escape through a liquid top layer. When heated from the bottom in an oil bath, the system starts polymerizing from the bottom, therefore leaving a layer of liquid at the top for the gas to escape.

Microscopic Characterization:

To prepare the samples for the electron microscope, they were first cut with a razor blade. The slices were then mounted on aluminum stubs and coated with Au/Pd in a sputter coater (Polaron Unit E5100). It is noted that the samples were put under vacuum both during sputter coating, as well as in the microscope itself. Some of the holes in the sample may be due to this process. The samples were characterized with a JEOL 6330 field emission scanning electron microscope with a 10 kV accelerating voltage.

Electrical Measurements:

To prepare the samples for electrical conductivity testing, they were first cut into rectangular prisms on the scale of a few centimeters in length. The ends were then covered with silver paint (Ted Pella) and allowed to dry. Copper tape (Ted Pella) was then attached to the silver contacts and the resistance was measured using a Keithly Model 2420 SourceMeter.

Mechanical Measurements:

To prepare the samples for testing, they were first cut into cylinders around 5 centimeters in diameter (the diameter of the glass jars they are prepared in) and a few centimeters in height. They were then tested using an Instron Model 5869 in compression mode.

REFERENCES

Rafiee, M. A., Rafiee, J., Wang, Z., Song, H., Yu, Z., & Koratkar, N. (2009). Enhanced Mechanical Properties of Nanocomposites at Low Graphene Content. *ACS nano*, 3(12), 3884-3890.

Vaia, R. A., & Wagner, D. H. (2004). Framework for nanocomposites. *Materials Today*, (November), 32-37.

Verdejo, R., Bernal, M. M., Romasanta, L. J., & Lopez-Manchado, M. a. (2011). Graphene filled polymer nanocomposites. *Journal of Materials Chemistry*, 21(10), 3301. doi:10.1039/c0jm02708a.

Vuluga, D., Thomassin, J.-M., Molenberg, I., Huynen, I., Gilbert, B., Jérôme, C., Detrembleur, C. (2011). Straightforward synthesis of conductive graphene/polymer nanocomposites from graphite oxide. *Chemical communications* (Cambridge, England), 47(9), 2544-6. doi:10.1039/c0cc04623j.

Weaver, C. L., Larosa, J. M., Luo, X., Cui, X. T., Basis, N., Medicine, R., Engineering, M. (2014). Electrically Controlled Drug Delivery from Graphene Oxide Nanocomposite Films. *ACS nano*, (Xx).

Young, R. J., Kinloch, I. a., Gong, L., & Novoselov, K. S. (2012). The mechanics of graphene nanocomposites: A review. *Composites Science and Technology*, 72(12), 1459-1476. doi:10.1016/j.compscitech.2012.05.005.

U.S. Pat. No. 8,110,026

U.S. Pat. No. 8,507,568

Geim, A. & Novoselov, K., The Rise of Graphene. *Nat. Mater.* 6, 183-192 (2007).

Novoselov, K. S. et al., Electric field effect in atomically thin carbon films. *Science* 306, 666-9 (2004).

Novoselov, K. S. et al., Two-dimensional gas of massless Dirac fermions in graphene. *Nature* 438, 197-200 (2005).

Zhang, Y., Tan, Y.-W., Stormer, H. L. & Kim, P., Experimental observation of the quantum Hall effect and Berry's phase in graphene. *Nature* 438, 201-4 (2005).

Balandin, A. a et al., Superior thermal conductivity of single-layer graphene. *Nano Lett.* 8, 902-7 (2008).

Chatterjee, S. et al., Mechanical reinforcement and thermal conductivity in expanded graphene nanoplatelets reinforced epoxy composites. *Chem. Phys. Lett.* 531, 6-10 (2012).

Lee, C., Wei, X., Kysar, J. W. & Hone, J., Measurement of the elastic properties and intrinsic strength of monolayer graphene. *Science* 321, 385-8 (2008).

Lee, J.-U., Yoon, D. & Cheong, H., Estimation of Young's modulus of graphene by Raman spectroscopy. *Nano Lett.* 12, 4444-8 (2012).

Stoller, M. D., Park, S., Zhu, Y., An, J. & Ruoff, R. S., Graphene-based ultracapacitors. *Nano Lett.* 8, 3498-502 (2008).

Suk, J. W., Piner, R. D., An, J. & Ruoff, R. S., Mechanical properties of monolayer graphene oxide. *ACS Nano* 4, 6557-64 (2010).

Boukhvalov, D. W. & Katsnelson, M. I., Modeling of graphite oxide. *J. Am. Chem. Soc.* 130, 10697-701 (2008).

Becerril, H. a et al., Evaluation of solution-processed reduced graphene oxide films as transparent conductors. *ACS Nano* 2, 463-70 (2008).

Liu, H. et al., Reduction of graphene oxide to highly conductive graphene by Lawesson's reagent and its electrical applications. *J. Mater. Chem. C* 1, 3104 (2013).

Pei, S. & Cheng, H.-M., The reduction of graphene oxide. *Carbon N. Y.* 50, 3210-3228 (2012).

Galpaya, D. et al., Recent Advances in Fabrication and Characterization of Graphene-Polymer Nanocomposites. *Graphene* 2012, 30-49 (2012).

Verdejo, R., Bernal, M. M., Romasanta, L. J. & Lopez-Manchado, M. A., Graphene filled polymer nanocomposites. *J. Mater. Chem.* 21, 3301 (2011).

Ansari, S., Kelarakis, A., Estevez, L. & Giannelis, E. P., Oriented arrays of graphene in a polymer matrix by in situ reduction of graphite oxide nanosheets. *Small* 6, 205-9 (2010).

Wei, T. et al., Preparation of graphene nanosheet/polymer composites using in situ reduction-extractive dispersion. *Carbon N. Y.* 47, 2296-2299 (2009).

Barroso-Bujans, F. et al., Tunable uptake of poly(ethylene oxide) by graphite-oxide-based materials. *Carbon N. Y.* 50, 5232-5241 (2012).

Singh, V. et al., Graphene based materials: Past, present and future. *Prog. Mater. Sci.* 56, 1178-1271 (2011).

Kim, H., Miura, Y. & Macosko, C. W., Graphene/Polyurethane Nanocomposites for Improved Gas Barrier and Electrical Conductivity. *Chem. Mater.* 22, 3441-3450 (2010).

An, X. et al., Stable aqueous dispersions of noncovalently functionalized graphene from graphite and their multifunctional high-performance applications. *Nano Lett.* 10, 4295-301 (2010).

Woltornist, S. J., Oyer, A. J., Carrillo, J.-M. Y., Dobrynin, A. V & Adamson, D. H., Conductive thin films of pristine graphene by solvent interface trapping. *ACS Nano* 7, 7062-6 (2013).

Wang, S., Zhang, Y., Abidi, N. & Cabrales, L., Wettability and surface free energy of graphene films. *Langmuir* 25, 11078-81 (2009).

Coleman, J. N., Liquid-Phase Exfoliation of Nanotubes and Graphene. *Adv. Funct. Mater.* 19, 3680-3695 (2009).

Whereas the disclosure has been described principally in connection with graphite and/or graphene, such description has been utilized for purposes of disclosure and is not intended as limiting the disclosure. To the contrary, it is recognized that the disclosed systems, methods, techniques and assemblies are capable of use with other materials having a layered structure or the like, such as, for example, boron nitride (e.g., hexagonal or graphitic boron nitride) or graphene oxide or the like.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A composite comprising:
    a polymeric matrix material formed from a combination of boron nitride and a polymer that defines an open pore foam structure, the open pore foam structure having cavities completely lined with boron nitride;
    wherein the boron nitride that completely lines the cavities of the open foam structure comprises overlapping layers or sheets that define a continuous film layer; and
    wherein the polymeric matrix material having the open pore foam structure having cavities lined with boron nitride is a thermal conductor and an electrical insulator.

2. The composite of claim 1, wherein the boron nitride is hexagonal boron nitride.

3. The composite of claim 1, wherein the polymeric matrix material is formed from monomers selected from the group consisting of styrene, isoprene, butyl methacrylate, divinylbenzene, methyl acrylate, tetra(ethylene glycol) diacrylate, and butyl acrylate.

4. The composite of claim 1, wherein the cavities of the polymeric matrix material include substantially spherical cavities.

5. The composite of claim 1, wherein the polymeric matrix material has a bulk conductivity of about 2 S/m, a compressive modulus of about 100 MPa, and a breaking strength of at least about 1200 psi., and a density of about 0.25 g/cm$^3$.

6. The composite of claim 1, wherein the polymeric matrix defines a nano-composite.

7. The composite of claim 1, wherein the polymeric matrix material defines a hollow nanocomposite.

8. The composite of claim 1, wherein the polymeric matrix material is formed from a monomer and a cross-linking agent.

9. The composite of claim 1, wherein the polymeric matrix is incorporated into a catalyst support.

10. The composite of claim 1, wherein the polymeric matrix is incorporated into a filter.

11. The composite of claim 1, wherein the polymeric matrix is incorporated into an industrial material.

12. The composite of claim 1, wherein the polymeric matrix functions as a heat-sink for an electronic component.

13. The composite of claim 1, wherein the polymeric matrix defines a flexible structure.

* * * * *